Nov. 19, 1968   D. R. HORTVET   3,411,341
HYDROSTATIC TESTING APPARATUS
Filed Jan. 3, 1966   2 Sheets-Sheet 1

INVENTOR
DOUGLAS R. HORTVET
BY
Andrus & Starke
Attorneys

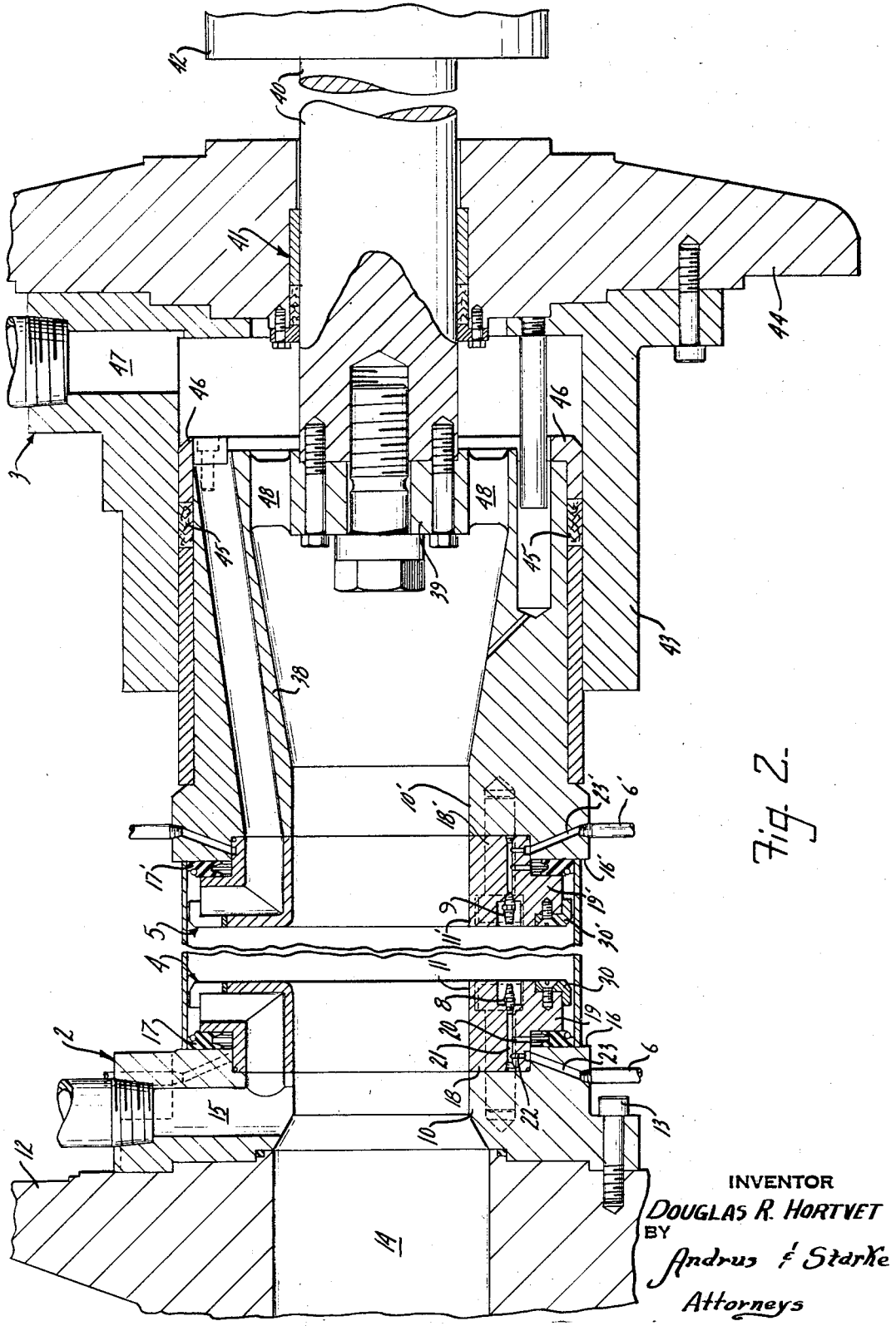

United States Patent Office 3,411,341
Patented Nov. 19, 1968

3,411,341
HYDROSTATIC TESTING APPARATUS
Douglas R. Hortvet, Houston, Tex., assignor to A. O. Smith Corporation, Milwaukee, Wis., a corporation of New York
Filed Jan. 3, 1966, Ser. No. 518,458
10 Claims. (Cl. 73—37)

ABSTRACT OF THE DISCLOSURE

This disclosure relates to testing a pipe sealed by head members, each including a sealing ring having a lesser diameter than the pipe. A ring seal is held by a garter spring within a head recess adjacent a flange abutting the pipe and has an inner groove which is pressurized to expand the seal. A valved opening connects the groove to the pipe to balance pressures.

One head includes an axially apertured piston with the same effective opposite end areas to eliminate end loading of the pipe. A hydraulic backup cylinder positions the piston to compensate for frictional forces and the stretch factors during testing.

---

This invention relates to hydrostatic testing apparatus and particularly to the head construction for sealing of the opposite ends of tubular members for high pressure hydrostatic testing of the tubular members.

Longitudinal pipes and similar tubular members may be formed from a plate member rolled into a tubular member and welded along a longitudinal seam. In use, such piping is often subject to pressurized flows and consequently, the welds as well as the pipe body must be tested during fabrication to insure satisfactory operation. In petroleum product flow systems and the like, present apparatus is generally limited to testing to approximately 90% of the minimum yield values of the pipe material.

Prior art devices for sealing the ends have generally included means overlapping the ends of the tubular member to provide a hydrostatic seal. Although such apparatus have provided satisfactory seals for testing to 90% of minimum yield values, the substantial overlap of the seal and member have prevented testing of the complete length thereof.

The present invention is particularly directed to an improvement in the head structure to permit testing to essentially 100% of the guaranteed minimum yield value with the test extending for essentially the complete length of the tubular member.

The present invention is particularly directed to the provision of an interval seal having only a slight overlap with the end of the tube member. The seal is hydraulically expanded by application of pressure to the inner face to form an initial seal prior to application of the hydrostatic tube pressure. The applied pressure area and the sealing area are related with the applied area being somewhat greater than the sealing lip to insure complete radial expansion of the seal against the tube wall. A balancing means or valve system is provided such that during the actual testing, balancing of the pressure across the seal is provided to prevent the hydrostatic testing pressure from forcing the seal away from the tube wall.

Upon decompression, the system is arranged such that both the hydrostatic testing pressure and the seal pressure are simultaneously broken to insure that high testing pressure is never applied to the seal after reducing the tube pressure which would tend to stress the face plate bolts above a safe working limit, and further assures that the heads are not withdrawn from the tube before the seals have been collapsed.

At least one end head is designed to move axially relative to the tubular member. Each of the heads includes a substantially planar radial face adapted to engage the adjacent end of the tubular member with sufficient force to prevent extrusion of the seal as a result of the high sealing pressures. However, the force is not such as to create undesirable column loading on the tubular member.

In accordance with a preferred novel construction of the present invention, a head member includes a sealing ring unit having an outer diameter slightly less than the internal diameter of the tubular member to be tested. A ring seal is clamped within a recess in the head immediately adjacent a radial sealing face defined by a flange portion. In testing, the sealing face abuts the end of the tubular member. The seal is contracted by a small garter spring or the like to permit introduction of the sealing unit into the tubular end and is provided with an inner peripheral area somewhat greater than the outer sealing lip area in the totally expanded position. An annular pressure groove is aligned with the inner portion of the seal. When the pressure is applied, the seal expands outwardly against the slight force of the garter spring and engages the immediately adjacent end of the tube and exerts an outward radial sealing pressure thereon.

The head unit includes a small lateral valved opening interconnecting the sealing pressure chamber with the interior of the tube. When the hydrostatic pressure is introduced into the tube at a pressure above that of the sealing pressure, the valve opens and transmits the hydrostatic pressure into the sealing chamber and thus maintains a balanced force across the seal to prevent loss or leakage thereof.

At least one head includes a piston arrangement having the sealing unit secured to the outer end thereof. In operation, the piston unit is hydraulically actuated to move into and out of the tubular pipe. The effective area of the back side of the piston or plunger is designed to equal that provided by the internal diameter of the tube. The hydrostatic testing pressure is introduced through suitable longitudinal openings in the cup-shaped piston and consequently eliminates end loading of the tube under test. This is particularly significant in testing to limits approaching actual yield values. Testing pressures cause a slight shortening of the tube and the one end head is provided with a hydraulic backup cylinder attached to the plunger. The pressure in this backup cylinder is regulated to compensate for frictional forces in the assembly and the stretch factors during the operation of the device to maintain the sealing face in engagement with the tubular member without destructive column loading.

The present invention is thus seen to provide an improved end seal for hydrostatic testing of pipe and the like wherein essentially the full length of the pipe is tested to 100% of minimum yield values.

The drawings furnished herewith illustrate a preferred construction of the present invention in which the above advantages and features are shown as well as others which will be clear from the following description.

In the drawings:

FIG. 2 is an enlarged vertical section through a portion of the pipe holding system to more clearly show details of this invention;

Figure 1:
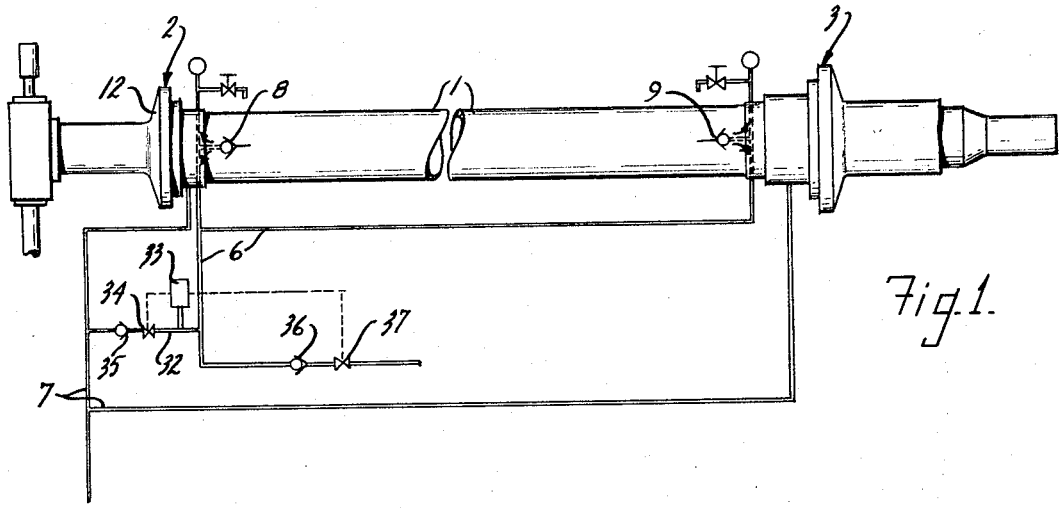
FIG. 1 is a diagrammatic view of a pipe testing system incorporating the present invention.

Referring to the drawings and particularly to FIG. 1, the illustrated embodiment of the invention includes a tubular pipe 1 mounted between a pair of sealing heads 2 and 3. The heads contain similar seal units 4 and 5, respectively, protruding slightly into the inner ends of the tube 1. Hydraulic lines 6 are connected to initially effect a radial expansion within the seal units 4 and 5 as hereinafter described to provide an initial sealing off of the ends of the tube prior to the application of hydrostatic tube pressure. After the initial sealing, a main hydraulic line 7 applies high hydrostatic pressures to a predetermined level through the opposite heads 2 and 3. In accordance with the present invention, the units 4 and 5 include similar check valves 8 and 9 permitting flow from pipe 1 into the respective seal units 4 and 5 to equalize the pressure across the seal face as hereinafter described. Referring particularly to FIG. 2, fragmentary enlarged heads 2 and 3 are shown positioned within the adjacent ends of the pipe 1. Generally, each of the seal units 5 and 4 is similarly constructed and unit 4 will be described with corresponding elements of unit 5 similarly identified by primed numbers.

The sealing unit 4 is secured to the head 2 and includes a positioning ring member 10 and a sealing ring member 11. The member 10 is generally ring-shaped with a stepped outer end face abutting the face of a head body 12 and secured thereto by a plurality of circumferentially distributed bolts 13 or the like. The central portion of head body 11 is provided with a prefill passageway 14 aligned with the openings of members 10 and 11. The hydrostatic test line 7 is connected to a radial passageway 15 for producing the test pressure within pipe 1 after prefilling through the large passageway 14.

The outer diameter of member 10 is greater than the pipe 1 and the end face 16 is finished to abut the end of pipe 1 and form a clamping surface for a ring seal 17 which is held in position by the member 11.

The seal unit 4 includes a ring seal 17 clamped between the inner face of the mounting ring member 10 and the seal holder member 11 which is bolted or otherwise secured in place. The member 11 includes an inner hub portion 18 telescoped into a corresponding recess in the ring member 10 and an enlarged inner flange portion 19 spaced inwardly of member 10 to define the annular recess within which the ring seal 17 is disposed for radial expansion and contraction only.

The annular recess defined by the spaced flange 19 and the adjacent wall 16 is connected by a small radial passageway 20 in portion 18 to an axial passageway 21 extending through the seal body and sealed at the opposite ends. Aligned radial passageways 22 and 23 in portion 18 and the member 10 connect the pretest hydraulic line 6 to the passageway 21.

The seal 17 is formed of a suitable material which has the ability of retaining its original shape under extreme cyclical radial stretch and compressive conditions. The material preferably also is such as to oppose extrusion and provide long wear. It is extremely important to a long and reliable seal life that essentially no permanent deformation results from repeated cycling.

Figure 3:
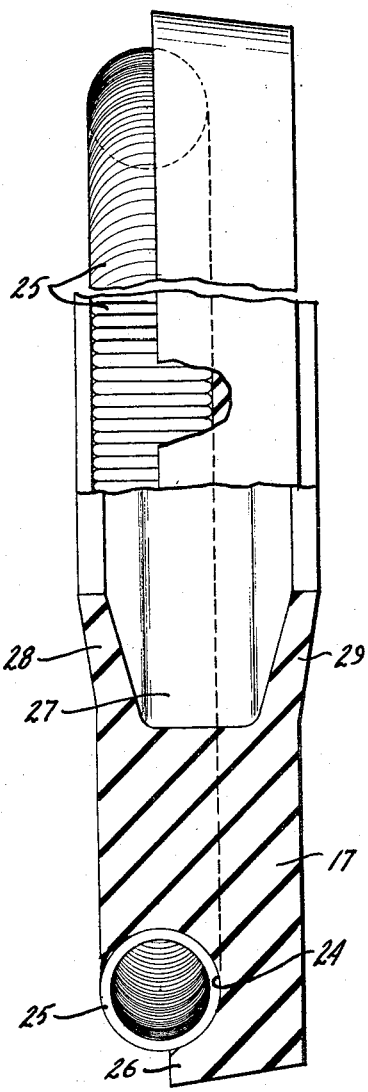
FIG. 3 is an enlarged fragmentary section of a seal member.

Generally, the seal is designed, as most clearly shown in FIG. 3, with a generally rectangular cross section having a greater depth than width. The outer peripheral corner is removed and formed with a generally circular recess 24 within which a suitable garter type coil spring 25 is disposed. The spring is preferably formed of a stainless steel or the like and is under compression to maintain roundness of the seal and to collapse the seal 17 for removal and insertion of the seal unit 4 internally of the pipe 1. The recess 24 also defines a small lip portion 26 inwardly from the outermost end of the pipe in the assembled relation. This is exposed to the hydraulic pressure within the pipe 1; the pressure passing through the spacing in the convolutions of the spring 25 and forcing the lip outwardly to assist in the seal-off as hereinafter described.

The inner periphery of the seal 17 is formed with an inverted frusto-conical recess 27 defining a pair of sliding sealing legs 28 and 29 which normally deflect outwardly. When the seal 17 is assembled within the recess, the legs 28 and 29 are compressed inwardly to provide a sealing engagement with the adjacent side walls of the recess to define a pressure chamber connected to passageway 20. The area of the seal 17 within the pressure chamber is greater than the area of the sealing area as a result of the removed corner. In the illustrated embodiment of the invention, the sealing is shown to be approximately ⅔ of the total width of the seal including the innermost end.

In operation, when a pressure is applied within the annular pressure seal chamber, the total pressure exerted on the inner area and the ends of the leg are transmitted through the smaller area of the sealing lip. This insures adequate radial pressure of the seal against the pipe 1 for a leak tight seal. The hydraulic pressure introduced into the chamber is selected to maintain a maximum pressure which will not exceed the minimum yield of the material under test.

A guide ring 30 having an L-shaped cross section is bolted or otherwise secured to the inner end of the face plate or member 11 with the outer leg extending backwardly over the outer radial wall thereof. The guide ring 30 is provided with a chamfered edge to guide the seal unit into the end of the pipe 1. Prior to insertion of a hydraulic pressure within the chamber, the garter spring 25 holds the seal 17 compressed inwardly into the recess 24 and within the sealing lip outer periphery of the guide ring to prevent engagement of the seal 17 with the pipe due to misalignment during the insertion and removal. Once the unit is assembled with the face of member 10 abutting the end of the tube 1, the hydraulic sealing pressure is applied through the separate sealing line 6 to expand the seal 17 outwardly to the position shown in FIG. 2 with the sealing lip 26 in firm sealing engagement with the adjacent end of the pipe 1. Hydrostatic test pressure is introduced into the pipe 1 through the use of a prefill valve, not shown, which is actuated simultaneously with the application of sealing pressure. After the pipe 1 has been essentially filled with water, the high hydrostatic pressure is applied to the inside of the pipe 1 through line 7 and passageway 15 to a minimum yield pressure. If the pipe test pressure should exceed the seal pressure, there is the danger that the pressure may force the seal lip 26 from the pipe wall.

Figure 4:
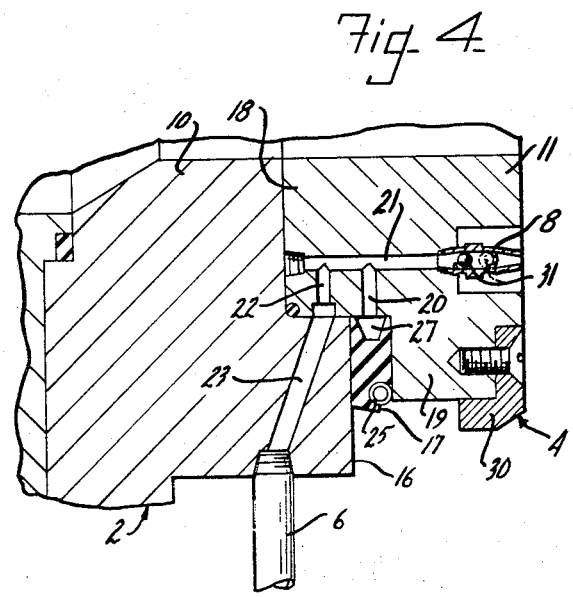
FIG. 4 is an enlarged fragmentary section showing the seal pressure passageways.

In accordance with the present invention, the small check valve 8, most clearly shown in FIG. 4, is mounted within the inner end of the lateral opening 21. The check valve 8 includes a housing ball check 31 which permits the movement of fluid from the inside of the pipe 1 into the lateral passageway 21 and thus into the expansion chamber of seal 17. The reverse flow is prevented by the action of the check valve.

When the pressure in the pipe 1 approaches or reaches the test pressure, the check valve 8 opens to permit balancing of the pressure across the seal. The pressure in the seal chamber is then the same as that within the pipe. The sealing force against the pipe 1 increases with the tube pressure and thus maintains a positive seal.

As shown in FIG. 1, the expansion seal line 6 and the main high pressure hydrostatic line 7 are interconnected by a bypass line 32 having a pressure responsive unit 33 controlling a valve 34 which is serially connected with a check valve 35 in line 32. Check valve 35 prevents flow from line 7 to the main hydrostatic line 6 but permits reverse flow if the pressure in line 6 increases above that in line 7 for any reason.

The line 6 is also provided with a check valve 36 and a main control valve 37. As the hydrostatic test pressure increases and the check valve 8 opens, the back pressure caused in the line 6 actuates the pressure responsive unit 33 to open valve 34 and to close the main seal line valve 37. The pressure within the pipe 1 can then be raised to the desired test pressure and essentially the complete length of the pipe 1 is tested except for the very small area covered by the sealing lip 26. This may be made an exceedingly small fraction of the total length and consequently provides testing for essentially 100% of the length of the pipe.

On decompression of the test pressure, the hydraulic system is arranged to decompress the seal pressure simultaneously with that of the main pipe. This is important to insure that the heads 3 and 4 are never drawn from the tube before the seals have collapsed and that the high test pressure is never left beneath the seal 17 after reducing the pipe pressure which would cause stressing of the face plate bolts above the safe working limits.

In order to readily insert and remove the pipe 1 from the apparatus, the head unit 3 is made movable and particularly includes a piston 38 having the outer end corresponding to and forming mounting member 10' with the sealing flange face 16 integrally formed thereon.

Generally, the piston 38 is a cylindrical member having the member 11' bolted or otherwise secured thereto. The base 39 of the piston 38 is secured to a hydraulically positioning shaft 40 which projects outwardly through a bearing and seal unit 41 and is connected to a suitable hydraulic positioner 42. The piston 38 is slidably mounted within a cylinder 43 bolted or otherwise secured to a mounting member 44 which includes unit 41. A suitable sealing packing 45 is suitably clamped in place by a retaining ring 46.

The inlet pressure or hydrostatic test pressure line 7 is connected to cylinder 43 to the back side of the plunger or piston 38, as at 47. The base 39 is provided with a plurality of openings 48 reducing the effective area of the back face side of the piston. The total effective area on the back side of the piston 38 equals the internal diameter of the pipe 1. Therefore, assuming no frictional forces existing between the packing 45 and bushing mounting arrangement of the assembly, and that the pipe 1 does not stretch during testing, the hydraulic forces on piston 38 would be equalized in the axial direction and zero end loading of the pipe 1 would result. In fact, there are frictional forces and pipe 1 will tend to shorten under test conditions.

The hydraulic positioner 42 which is attached to the piston 38 provides a closely regulated output force to overcome the frictional and stretch factor and forces and to just maintain the sealing faces 16 and 16' in engagement with the adjacent end faces of pipe 1.

Positioner 42 is of particular significance in testing of the pipe 1 close to the actual yield values of the pipe material because of the tendency for buckling and oversizing of the pipe with column or axial loading; particularly with pipe of a small diameter and/or thin pipe wall. A very small amount of end loading however is necessary to essentially eliminate gaps between the ends of pipe 1 and the faces 16 and 16' during the testing. Any noticeable gap may result in extrusion of the seal 17 with a consequent complete loss or failure of the end seal. The pipe ends are made as parallel as practically and economically possible to minimize gaps between faces 16 and 16' and pipe ends. A small gap can be tolerated; for example, a gap in the area of 3/32 inch between the sealing face and the pipe end has been found to be readily bridged under 1500 p.s.i. pressure with no apparent detrimental effect to the seal unit relative to its extrusion characteristics and its endurance.

The present invention has been found to provide a highly improved high pressure seal for testing of tubular members to 100% of the minimum yield value and for essentially testing the complete length of the tube member.

Various modes of carrying out the invention are contemplated as being within the scope of the following claims particularly pointing out and distinctly claiming the subject matter which is regarded as the invention.

I claim:

1. A temporary hydraulic seal unit for testing of tubular members having planar end edges by releasably sealing opposite ends of the member and introducing a fluid pressure therein, the improvement in an end sealing head comprising
   a stepped support unit having a first portion of a diameter slightly less than the internal diameter of members to be tested and an adjacent flange portion defining a flat end sealing radial face for abutment with the end edge of the members to be tested, said unit having an encircling recess in the first portion with the one wall in the plane of the radial face,
   a ring seal of a flexible material disposed within said recess, and
   means connected to the recess to introduce a selected pressure within the recess for expanding the ring seal outwardly into engagement with the portion of the tubular member abutting the end flange portion, and means holding said flat end sealing face engaging said end edge and preventing extrusion of said ring seal.

2. The hydraulic seal unit of claim 1 having a balance means connecting the recess and the inside of the member to be tested to balance the fluid pressure across the seal.

3. In the improvement of the end sealing head of claim 2,
   a pressure system including a main pressure line connected to a source and a seal pressure line connected to a source,
   a normally closed jumper line connecting said main pressure line and the seal pressure line, and
   valve means associated with said lines to open the jumper line and to close the seal pressure line between the main pressure line and the seal pressure line to its source in response to a selected pressure within the seal pressure line.

4. The hydraulic seal unit of claim 2 having a hydraulic positioner means coupled to the support unit to hold said end sealing face in sealing engagement with the end face of the member.

5. The hydraulic seal unit of claim 1 wherein said seal has the outer corner removed to define a sealing lip projecting axially from the flange.

6. The hydraulic seal unit of claim 5 having a garter type coil spring disposed within said corner and stressed to bias said ring seal into the recess.

7. In the improvement of the end sealing head of claim 1,
   a plunger connected to the cylindrical support unit and slidably disposed in a tubular support, the effective areas of the opposite ends of the plunger being equal and subjected to the test pressure within a member under test to prevent end loading of the member, and
   a positioner unit connected to the plunger to hold the radial face in engagement with the adjacent end of the member under test, said positioner unit establishing a regulated pressure to maintain a minimal end loading of the member under test to essentially prevent formation of a gap between the member and said radial face.

8. The hydraulic seal unit of claim 1 wherein the support unit includes a seal support ring of a diameter slightly less than the internal diameter of members to be tested and a smaller tubular extension secured within a recess in a mounting ring defining an adjacent flange portion with a radial end sealing face,
   the support ring having the larger diameter portion spaced from the sealing face to define a seal recess,
   a ring seal disposed within said recess, said seal having the outer corner removed to define an outer sealing lip projecting inwardly from the sealing face,
   said support ring having passageways connected to the seal recess and to a pressure connection and open at the outer face of the support ring,
   pressure means connected to the recess to introduce a selected pressure within the recess for expanding the ring seal outwardly, and a check valve in the passageway at the face of the support ring and closed by the pressure in the passageway.

9. The hydraulic seal unit of claim 1 wherein said recess is generally rectangular with the radial depth greater than the axial width, and said seal has a generally corresponding cross-section with the innermost face recessed to define a pair of sliding sealing legs engaging the side walls of the recess, said seal being formed with the legs deflected outwardly in the disassembled state.

10. The hydraulic seal unit of claim 9 having an outer corner of the seal removed and a recess formed in the removed corner to define a sealing lip, and a coil spring within said recess stressed to collapse the seal within said recess.

References Cited
UNITED STATES PATENTS

| | | | |
|---|---|---|---|
| 2,300,385 | 10/1942 | Kollberg et al. | 277—3 |
| 2,559,564 | 7/1951 | Sperling | 277—34 |
| 2,707,388 | 5/1955 | Kent | 73—49.6 |
| 3,312,103 | 4/1967 | Goeke | 73—49.6 |
| 3,166,332 | 1/1965 | Olson | 277—171 |

S. CLEMENT SWISHER, *Primary Examiner.*

WILLIAM HENRY II, *Assistant Examiner.*